United States Patent [19]
Shimizu et al.

[11] Patent Number: 6,055,559
[45] Date of Patent: *Apr. 25, 2000

[54] PROCESS SWITCH CONTROL APPARATUS AND A PROCESS CONTROL METHOD

[75] Inventors: Toshiyuki Shimizu; Hiroaki Ishihata, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/710,552

[22] Filed: Sep. 19, 1996

Related U.S. Application Data

[63] Continuation-in-part of application No. 08/398,155, Mar. 3, 1995, abandoned.

[30] Foreign Application Priority Data

Mar. 7, 1994 [JP] Japan ..................................... 6-035535

[51] Int. Cl.[7] ...................................................... G06F 9/46
[52] U.S. Cl. ............................................. 709/107; 709/108
[58] Field of Search ................................... 395/673, 672; 709/107, 108

[56] References Cited

U.S. PATENT DOCUMENTS

| | | | |
|---|---|---|---|
| 4,159,516 | 6/1979 | Henrion et al. | 395/200 |
| 4,887,202 | 12/1989 | Tanaka et al. | 364/200 |
| 5,047,923 | 9/1991 | Elstner et al. | 364/200 |
| 5,269,005 | 12/1993 | Heil et al. | 395/275 |
| 5,367,679 | 11/1994 | Khaira | 395/650 |
| 5,386,561 | 1/1995 | Huynh et al. | 395/650 |
| 5,388,254 | 2/1995 | Betz et al. | 395/575 |
| 5,455,940 | 10/1995 | Daniel et al. | 395/182.02 |
| 5,499,370 | 3/1996 | Hosaka et al. | 395/650 |
| 5,588,125 | 12/1996 | Bennett | 395/306 |
| 5,721,922 | 2/1998 | Dingwall | 395/673 |

OTHER PUBLICATIONS

Govindan et al, Scheling and IPC Mechanisms for Continous Media, ACM, 1991 pp. 68–80.

*Primary Examiner*—Lucien U. Toplu
*Assistant Examiner*—Alice Park
*Attorney, Agent, or Firm*—Staas & Halsey, LLP

[57] ABSTRACT

A status management unit manages a free status capable of invoking a process switch and a critical status. When a process currently being executed is in an input/output process or in a critical status during a message communication, a switch control means controls a control signal for a process switch, such that a process switch does not take place.

12 Claims, 12 Drawing Sheets

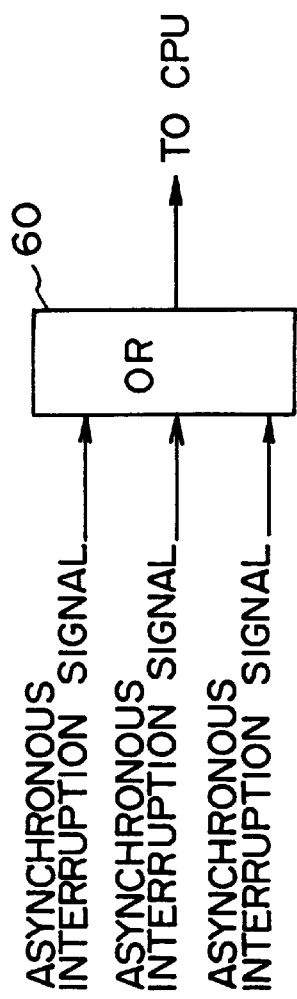
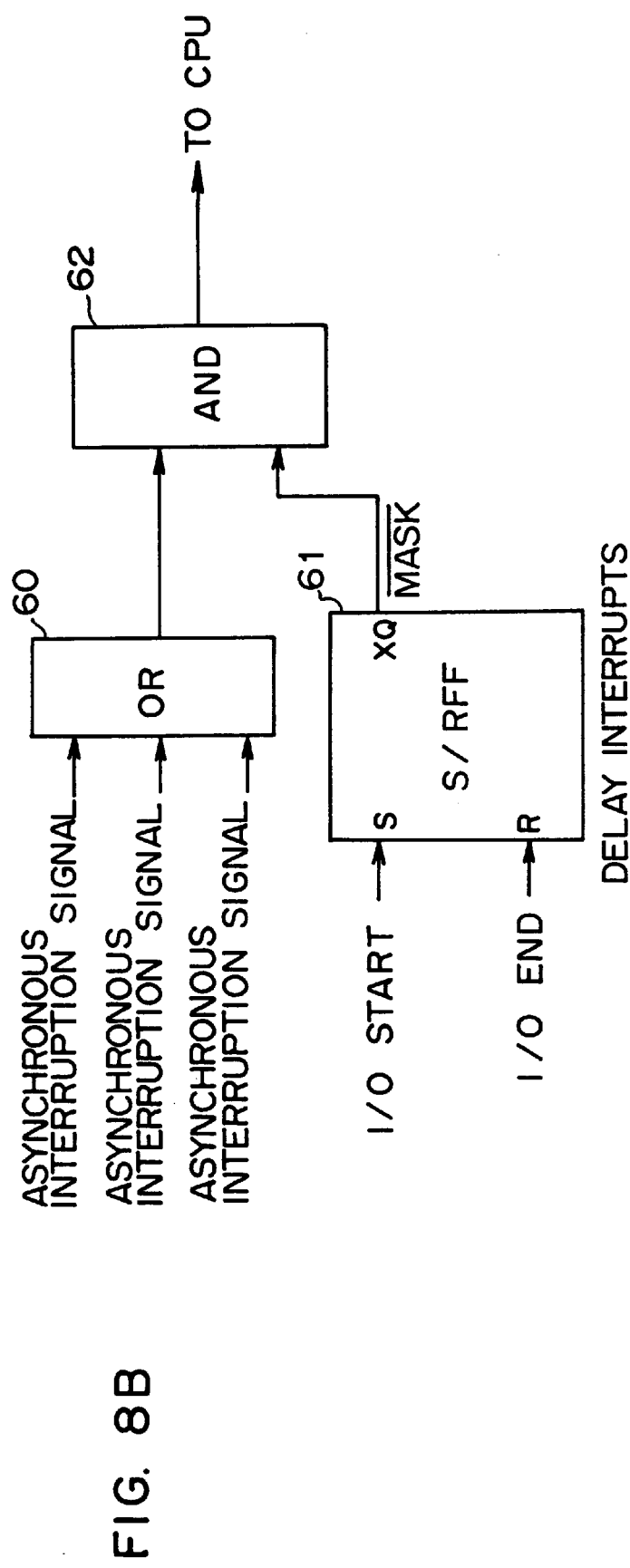
FIG. 8A
FIG. 8B

FIG. 11

```
1  module fsm(end, start, reset, timer, timer0, clk, int, ack, nack, switch);
2  input end, start, reset, timer, timer0, int, clk;
3  output ack, nack, switch;
4
5  reg [1:0] cstate, nstate;
6
7  parameter[1:0] FREE = 2'b00, USED = 2'b01, SWITCH0 = 2'b10, SWITCH = 2'b11;
8  always 0 (cstate or end or start
9           or reset or timer or timer0 or int)
10 begin
11     nstate = cstate;
12     if (int)
13         nstate = FREE;
14     else case (cstate)
15         FREE:
16             if (start)
17                 nstate = USED;
18             else if (timer0)
19                 nstate = SWITCH;
20                                              . . . .
            . . . .
```

FIG. 12

```
...
21      USED:
22          if (end)
23              nstate = FREE;
24          else if (timer0)
25              nstate = SWITCH0;
26      SWITCH0:
27          if (end || timer)
28              nstate = FREE;
29      SWITCH:
30          if (reset || start || timer)
31              nstate = FREE;
32      endcase
33  end
34
35  always 0 (posedge clk)
36  begin
37      cstate = nstate;
38  end
39
40  wire ack = (cstate == FREE) && start
41             || (cstate == USED) && end
42             || (cstate == SWITCH0) && end;
43             || (cstate == SWITCH) && (reset || start)
44  wire nack = (cstate == USED) && start
45             || (cstate == SWITCH0) && start;
46  wire switch = (cstate == SWITCH) && (start || timer)
47             || (cstate == SWITCH0) && end;
48
49  endmodule
50
```

PROCESS SWITCH CONTROL APPARATUS AND A PROCESS CONTROL METHOD

This application is a continuation-in-part of application Ser. No. 08/398,155, filed Mar. 3, 1995, now abandoned.

BACKGROUND OF THE INVENTION

1. Field of the Invention

This invention pertains to a process switch control apparatus and a process control method for use in a multi-process system in which a plurality of processes operate time divisionally, or segments of time.

2. Description of the Related Art

The operation of a computer system is required to be expedited more than ever before. Such a computer system generally runs a plurality of processes. Also, a system has been realized for improving computing performance by connecting a plurality of mutually communicable computers. Message communications for use in such a system require as small a time overhead as possible for not sacrificing computing performance. Similarly, a data input/output (I/O) process of such a system requires as small a time overhead as possible. Here, a process is defined as an execution unit of a computer system running under an execution right granted by a CPU. Such an execution unit includes what is called a task.

Conventionally, when a computer system runs a plurality of processes, it has been necessary to have an operating system (hereafter referred to as OS) intervene in a series of input/output processes. However, an OS intervention greatly protracts computer processing time, e.g. for processing the shift of control from a user process to the OS. To reduce an OS overhead, new arts have been devised such as the ones disclosed in the Japanese Patent Application Official Circular 1991-150659 (a data transfer system) and the Japanese Patent Application Official Circular 1993-233440 (a data transfer system having a buffer function), which describe a transfer system at user level without an OS intervention. Yet, even these arts are applicable only to a case in which a computer has only one process for transmitting a message, thereby rendering their applications to a multi-process environment difficult.

Conventionally, when an attempt is made to enable a message communication or an input/output process at user level without an OS intervention, a multi-process environment has a problem of losing consistency of the message communication or input/output process as a single operation (e.g. a message communication), when it is split into a plurality of transactions, inasmuch as operations of other processes intervene because of process switching between the transactions.

FIG. 1A and FIG. 1B are explanatory diagrams illustrating a purpose of this invention. In the following description, a word "switch" is used in a sense meaning "an execution of switching". For instance, an expression "a process switch" is defined as meaning "switching a process".

FIG. 1A illustrates a generic process switch. When a task A is running, a generation of an interruption invoking a process switch causes the OS to allocate a CPU time to a task B, thereby starting the run of task B.

FIG. 1B illustrates the execution of task A in a period between the start and end of a message communication or an input/output process. Upon generating an interruption invoking a process switch, before task A starts a message communication or an input/output process, shown as timing (TASK SWITCH) (1), even if the process switch switches a CPU execution right to task B, no problem arises. On the other hand, upon generating an interruption invoking a process switch in a period of a critical section, shown as timing (TASK SWITCH) (2), in which a task A is performing a message communication or an input/output process at a user level without an OS intervention, a problem arises.

That is, because task A is performing a message communication or an input/output process at a user level when task B starts running with a CPU time having been allocated by a process switch in the above period, there are cases in which a message communication or an input/output process is executed similar to the one done by task A. In such a case, because of a lack of a mechanism represented by an OS for switching the status of a message communication device or an input/output device, such a device experiences interference between the operation of task A and that of task B, which destroys the consistencies of the respective operations, thus rendering it impossible to obtain correct results of operation.

SUMMARY OF THE INVENTION

This invention, conceived based on the above background, aims at enabling a highly efficient message communication and input/output process without an OS intervention, even under a multi-process environment in which a plurality of processes operate time divisionally.

For this purpose, this invention provides at least a status management unit for managing statuses including a first status enabling a process switch and a second status disabling a process switch for the reason that a process currently being executed is an input/output process or a message communication, and a switch control unit for controlling the second status to ensure that a process switch does not take place.

Alternatively, this invention provides at least a status management unit for managing a first status capable of starting an input/output process or a message communication and a second status in which an input/output process or a message communication is currently being executed and a control unit for controlling a process being executed in the second status not to permit a generated event if this event indicates a start of an input/output process or a message communication.

This invention having the above basic configuration enables direct control of a message communication and an input/output process at a user level with an overhead kept to a minimum even in a multi-process environment.

As a result, this invention enables efficient use of a computer performance. Especially, this invention is particularly effective in improving a performance e.g. of a parallel c$^6$mputer system having frequent,message communications between computers.

BRIEF DESCRIPTION OF THE DRAWINGS

One skilled in the art can easily understand additional features and,objects of this invention from the description of the preferred embodiments and some of the attached drawings., In the drawings:

In the drawings:

FIG. 8A is the first of block diagrams illustrating in a two-part series an example of the asynchronous interruption control circuit realizing the fifth operating mode;

FIG. 8B is the second of block diagrams illustrating in a two-part series an example of the asynchronous interruption control circuit realizing the fifth operating mode;

FIG. 11 is the first of the list of program statements illustrating in a two-part series a method for realizing a status transition of the fourth operating mode; and FIG. 12 is the second of the list of program statements illustrating in a two-part series a method for realizing a status transition of the fourth operating mode.

DESCRIPTION OF THE PREFERRED EMBODIMENTS

Figure 1A:
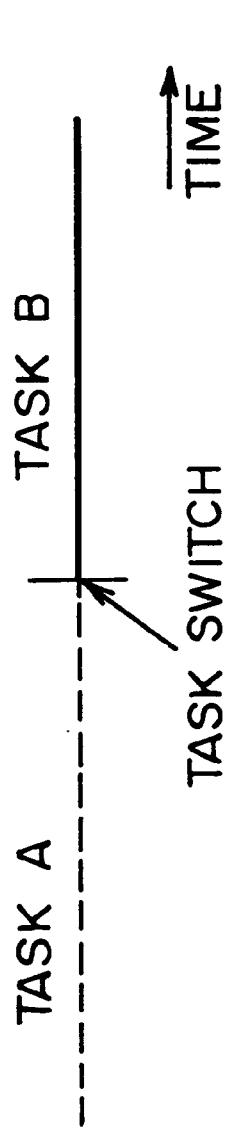
FIG. 1A illustrates a generic process switch.
Figure 1B:
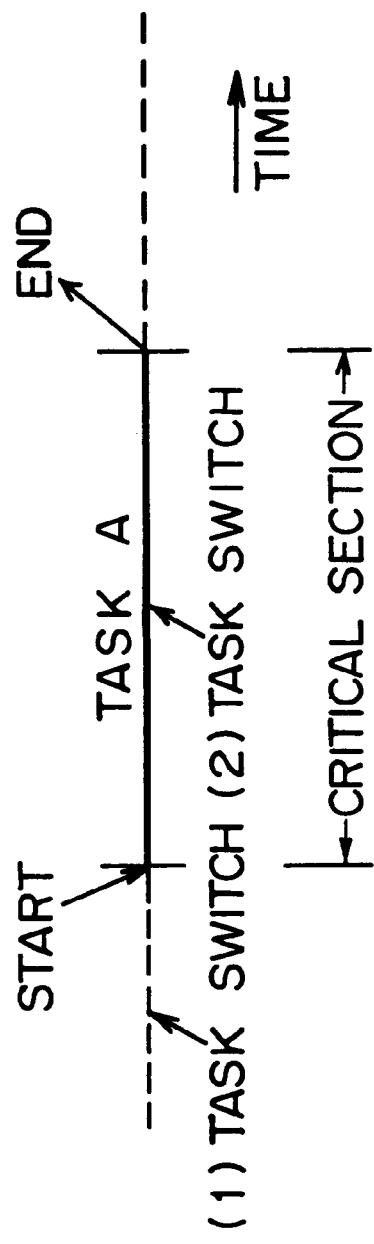
FIG. 1B illustrates the execution of a task A in a period between the start and end of a message communication or an input/output process.
Figure 2A:
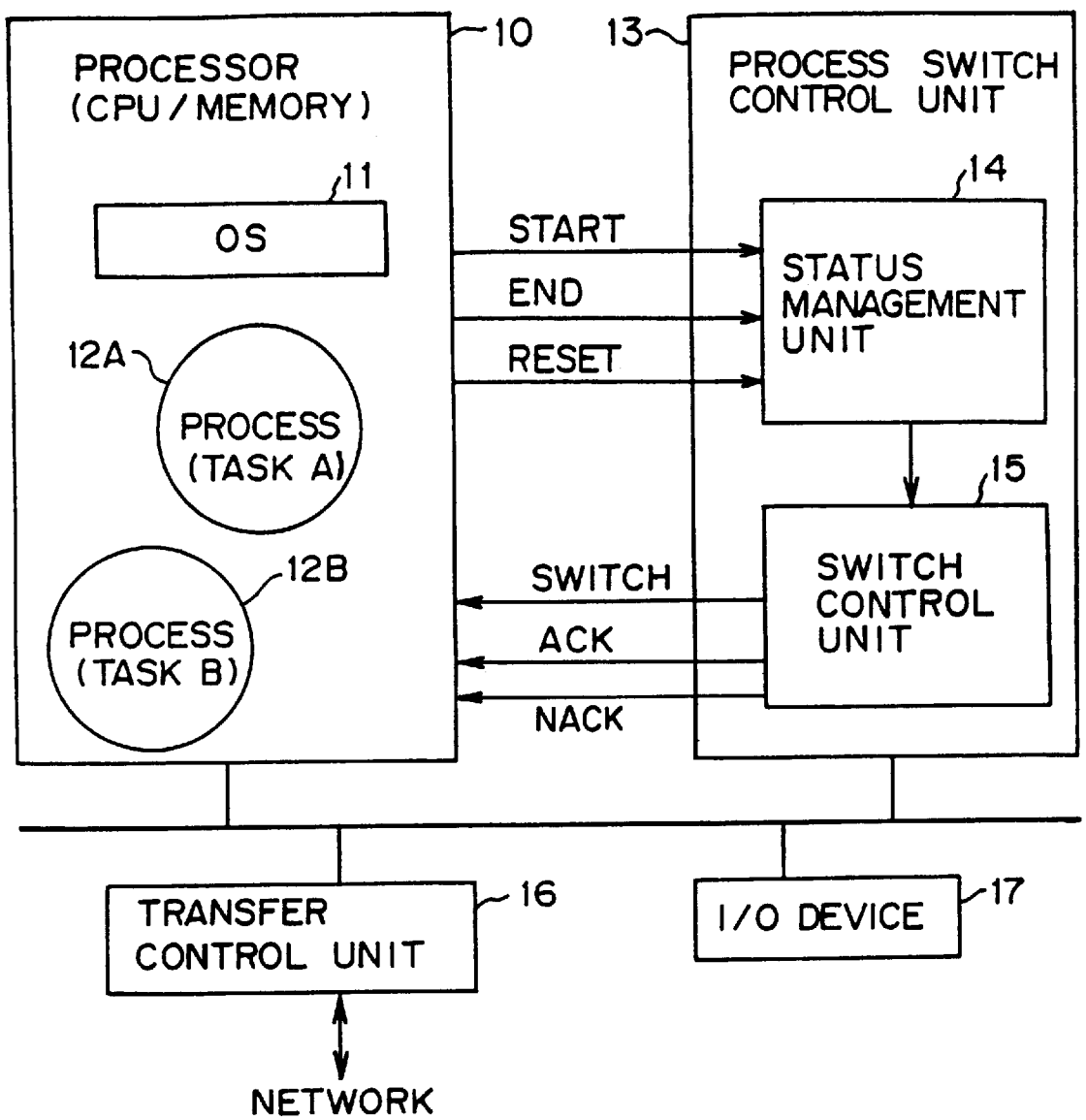
FIG. 2A is a block diagram illustrating the global configuration of a preferred embodiment of this invention.
Figure 2B:
FIG. 2B is an explanatory chart illustrating basic timing of a preferred embodiment of this invention.

FIG. 2A is a block diagram illustrating the global configuration of a preferred embodiment of this invention. FIG. 2B is an explanatory chart illustrating basic timing of a preferred embodiment of this invention.

In FIG. 2A, a processor 10 comprises a CPU and a memory. An operating system (OS) 11 enables a multiprocess environment. Processes 12A and 12B are execution units of a computer system run with a CPU execution right. A word "task" used in the following description has the same meaning as a word "process". The processor 10 time divisionally allocates segments of CPU time to each of a plurality of processes comprising process 12A (a task A), process 12B (a task B) and so forth, which run under the control of the OS 11.

A process switch control unit 13 controls a process switch. A status management unit 14 manages a status for controlling a process switch. A switch control unit 15 controls an output of a control signal "Switch", which is a timing signal for switching a process.

A transfer control apparatus 16 controls a message transfer to a network.

An I/O device 17 may be a disk apparatus.

The processor 10 outputs three control signals, namely "Start", "End" and "reset", to the process switch control unit 13. Control signal "Start" or "End" is a signal indicating an event that a process currently being executed starts or ends a message communication using the transfer control apparatus 16, or an input/output process for the I/O device 17. Control signal "reset" is a signal instructing the clearance of a status managed by the status management unit 14.

Meanwhile, the process switch control unit 13 outputs to the processor 10 control signal "Switch" and a control signal "ack". Control signal "Switch" is a timing signal instructing the invocation of a process switch. Control signal "ack" is a response signal for an event the processor 10 requests to the process switch control unit 13.

Described sequentially below are seven operating modes of this invention.

Figure 3A:
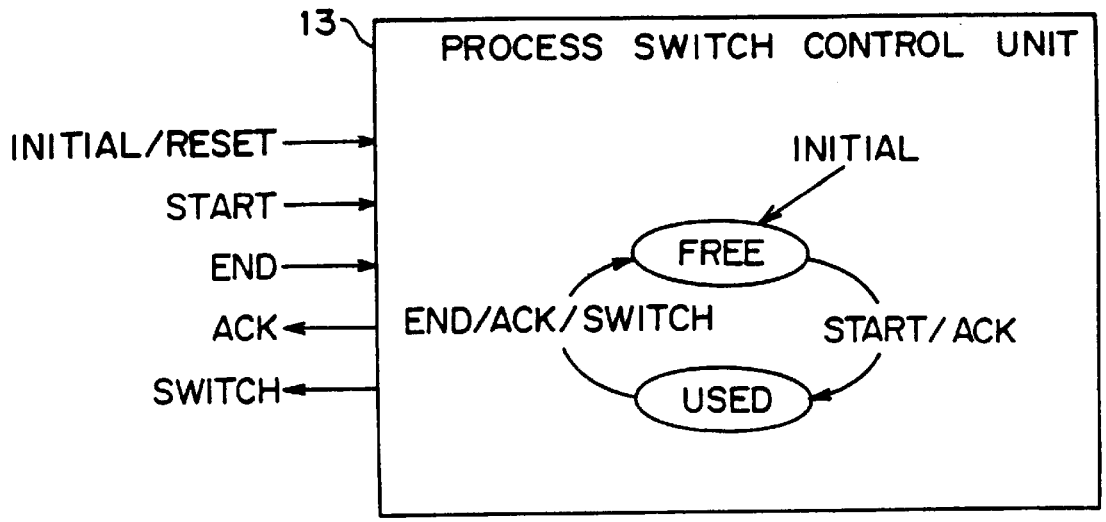
FIG. 3A is an explanatory diagram illustrating a status transition of a first operating mode.

First, in a first operating mode of the preferred embodiment of this invention, as shown in FIG. 3A, the status management unit 14 in the process switch control unit 13 (shown in FIG. 2A) manages two status, namely a "free" status and a "used" status. The "free" status refers to a status in which a process currently being executed is neither an input/output process nor a message communication, and thus is ready for a process switch. The "used" status refers to a status in which a process currently being executed is either an input/output process or a message communication, and thus inhibiting a process switch.

Based on an event caused by an initialization signal "initial" generated internally, or control signal "reset" inputted from the processor 10 (shown in FIG. 2A), the status management unit 14 in the process switch control unit 13 (shown in FIG. 2A) sets the current status as the "free" status.

Next, in the "free" status, when the process switch control unit 13 receives from the processor 10 control signal "Start" indicating an event that a process currently being executed starts an input/output process using the transfer control apparatus 16 or a message communication to the I/O device 17, the status management unit 14 shifts the current status from the "free" status to the "used" status, and the switch control unit 15 outputs to the processor 10 control signal "ack", which is a response signal corresponding to the above event.

In the "used" status, even if the process switch control unit 13 generates an event (a timer event) invoking a process switch, the switch control unit 15 ignores this event. Further, in the "used" status, when the process switch control unit 13 receives from the processor 10 control signal "End" indicating an event that a process currently being executed ends either a message communication using the transfer control apparatus 16 or an input/output process for the I/O device 17, the status management unit 14 shifts the current status from the "used" status to the "free" status. Then, the switch control unit 15 outputs to the processor 10 control signal "Switch" instructing the invocation of a process switch, concurrently with control signal "ack", which is a response signal for the above event.

As a result, the processor 10 does not invoke a process switch, while a single process executes a message communication using the transfer control apparatus 16 or an input/output process for the I/O device 17, but invokes a process switch from the above process to another process only after completing the current process. This enables the consistency of a message communication or an input/output process to be maintained without an OS intervention, even under a multi-process environment.

Figure 3B:
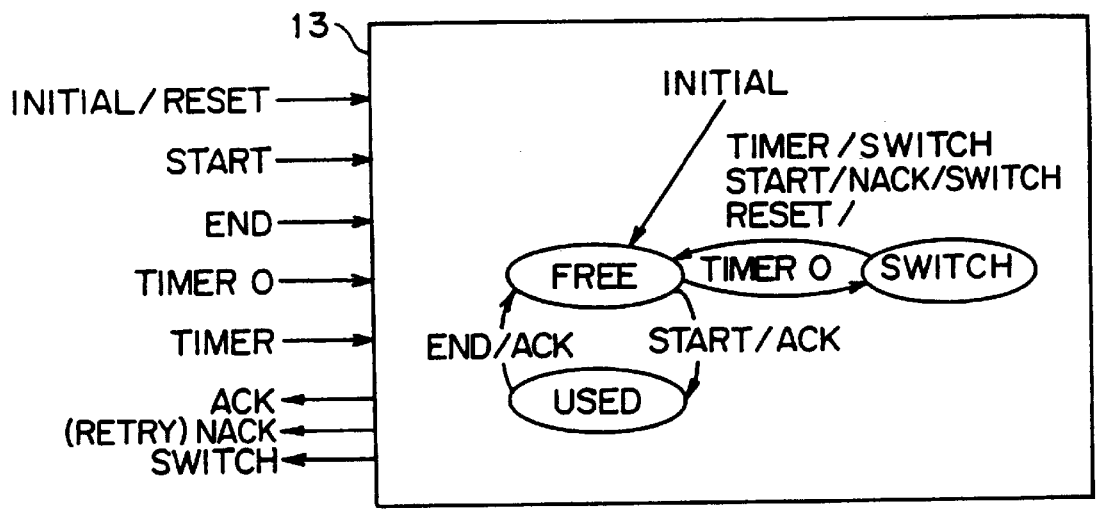
FIG. 3B is an explanatory diagram illustrating a status transition of a second operating mode.

Second, in a second operating mode of the preferred embodiment of this invention as shown in FIG. 3B, the status management unit 14 in the process switch control unit 13 (shown in FIG. 2A) manages three status, namely a "free" status, a "used" status and a "switch" status. The "free" status and the "used" status are the same as those explained in the description of the first operating mode as shown in FIG. 3A. The "switch" status is a switch advance warning status indicating a status in which a timer signal "timer", triggering a process switch is generated in a predetermined period.

An initial setting of the "free" status is the same as that in the first operating mode.

Also, a transition from the "free" status to the "used" status, based on a control signal "Start" and its accompanying operation of outputting a control signal "ack", are the same as those explained in the description of the first operating mode.

In the "used" status, even if the process switch control unit 13 generates an event (a timer event) invoking a process switch by the timer signal "timer", the switch control unit 15 ignores this event. Further, in the "used" status, when the process switch control unit 13 receives from the processor 10 control signal "End", indicating an event that a process currently being executed ends either a message communication using the transfer control apparatus 16 or an input/output process for the I/O device 17, the status management unit 14 shifts the current status from the "used" status to the "free" status. Then, the switch control unit 15 outputs to the processor 10 control signal "ack", which is a response signal for the above event. At this time, the switch control unit 15 does not output to the processor 10 control signal "Switch" for invoking a process switch.

Next, in the "free" status, when the process switch control unit 13 receives from a control circuit (not shown) an advance timer signal "timer0" indicating that the timer signal "timer" triggering a process switch is generated in a predetermined period, the status management unit 14 shifts the current status from the "free" status to the "switch" status.

Then, in the "switch" status, when the process switch control unit 13 receives from a control circuit (not shown) the timer signal "timer" triggering a process switch, the status management unit 14 shifts the current status from the "switch" status to the "free" status. Further, the switch control unit 15 outputs to the processor 10 control signal "Switch" instructing the invocation of a process switch.

Also, in the "switch" status, when the process switch control unit 13 receives from the processor 10 a control signal "Start", indicating an event that a process currently being executed starts a message communication using the transfer control apparatus 16 or an input/output process for the I/O device 17, the status management unit 14 shifts the current status from the "switch" status to the "free" status. Then, the switch control unit 15 outputs to the processor 10 control signal "Switch", instructing the invocation of a process switch concurrently with control signal 'nack', which is a negative response or retry signal corresponding to the above event.

In addition, in the "switch" status, when the process switch control unit 13 receives from the processor 10 a control signal "reset" instructing a reset of the status, the status management unit 14 shifts the current status from the "switch" status to the "free" status.

Figure 6A:
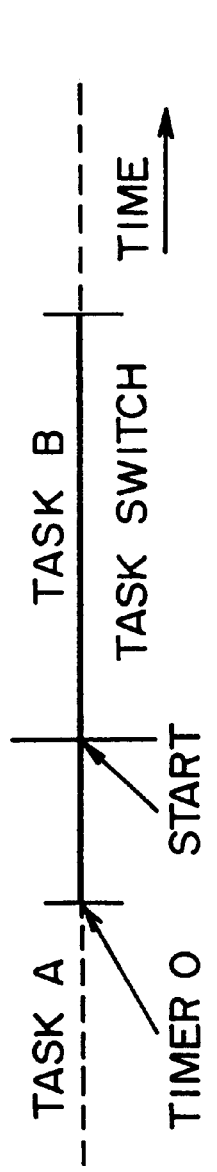
FIG. 6A is a timing chart illustrating a process switch of the second operating mode.

FIG. 6A is a timing chart illustrating a process switch of the second operating mode. When the process switch control unit 13 receives from the processor 10 the advance timer signal "timer0", while task A is running in the "free" status, the status management unit 14 shifts the current status from the "free" status to the "switch" status. In the "switch" status, upon a detection of control signal "Start" indicating an event that task A is about to start an input/output process or a message communication, because a CPU execution right is forcibly switched from task A to task B, thereafter, task A is suspended, the start of an input/output process or a message communication by task A is inhibited, and the processor 10 starts running task B.

Hence, in the second operating mode, when a message communication or an input/output process is invoked at a timing in close proximity to a process switch, the invocation of a message communication or an input/output process is temporarily suspended, but the invocation of a process switch is enforced. Thus, it becomes possible to prevent the interval of a process switch from being overly extended.

Figure 3C:
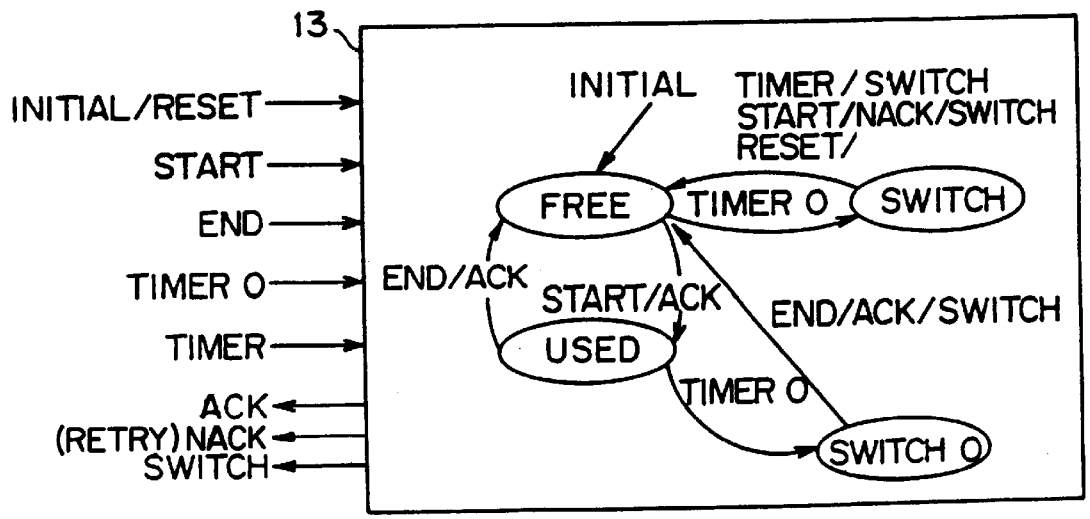
FIG. 3C is an explanatory diagram illustrating a status transition of a third operating mode.

Third, in a third operating mode of the preferred embodiment of this invention, the status management unit 14 (shown in FIG. 2A) controls four status, namely the "free" status, the "used" status, the "switch" status, and a "switch0" status (as shown in FIG. 3C). The "free" status, the "used" status and the "switch" status are the same as those explained in the description of the second operating mode as shown in FIG. 3B. The "switch 0" status is a preparation status for a process switch to which the status management unit 14 shifts the current status from the "used" status, upon receiving the advance timer signal "timer0".

The transition from the initial status to the "free" status is the same as that in the first or second operating mode.

Also, a transition from the "free" status to the "used" status based on control signal "Start" and its accompanying operation of outputting control signal "ack", are the same as those in the first or second operating mode.

A transition from the "used" status to the "free" status based on control signal "End" and its accompanying operation of outputting control signal "ack", are the same as that in the second operating mode.

A transition from the "free" status to the "switch" status based on the advance timer signal "timer0", is the same as that in the second operating mode.

Further, a transition from the "switch" status to the "free" status based on the timer signal "timer", and its accompanying operation of outputting control signal "Switch", as well as a transition from the "switch" status to the "free" status based on control signal "Start", and its accompanying operation of outputting control signals 'nack' and "Switch", as well as a transition from the "switch" status to the "free" status based on control signal "reset", are the same as those in the second operating mode.

In the "used" status, when the process switch control unit 13 receives from a control circuit (not shown) the advance timer signal "timer0" triggering a process switch, the status management unit 14 shifts the current status from the "used" status to the "switch0" status, which is a preparation status for a process switch. Further, the switch control unit 15 outputs to the processor 10 control signal "Switch" instructing the invocation of a process switch.

In the "switch0" status, when the process switch control unit 13 receives from the processor 10 control signal "End", indicating an event that the process currently being executed ends a message communication using the transfer control apparatus 16 or an input/output process for the I/O device 17, the status management unit 14 shifts the current status from the "switch0" status for the "free" status, which is a preparation status of a process switch. Then, the switch control unit 15 outputs to the processor 10 control signal "Switch", instructing the invocation of a process switch concurrently with control signal "ack", which is a response signal for the above event.

Figure 6B:
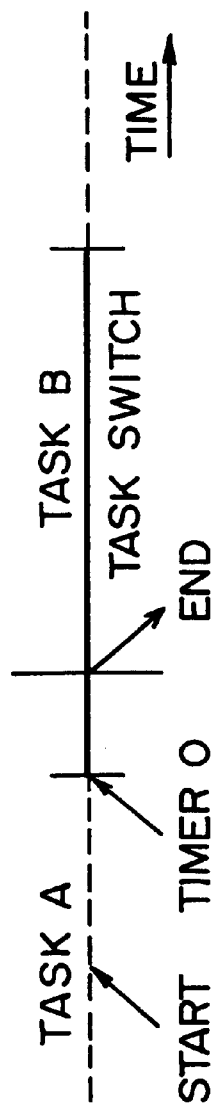
FIG. 6B is a timing chart illustrating a process switch of the third operating mode.

FIG. 6B is a timing chart illustrating a process switch of the third operating mode.

When task A starts an input/output process or a message communication and the current status is the "used" status, an input of the advance timer signal "timer0" shifts the current status to the "switch0" status. In the "switch0" status, a subsequent process switch is delayed. Then an input of control signal "End", indicating that task A ends an input/output process or a message communication invokes a task switch (a process switch), transfers the CPU execution right over from task A to task B.

Thus, in the third operating mode, when a timing for invoking a process switch comes while a process executes a message communication or an input/output process, an event invoking a process switch is delayed, and an event indicating the end of the above process invokes a process switch, which prevents the time interval of a process switch from being overly extended.

Figure 4A:
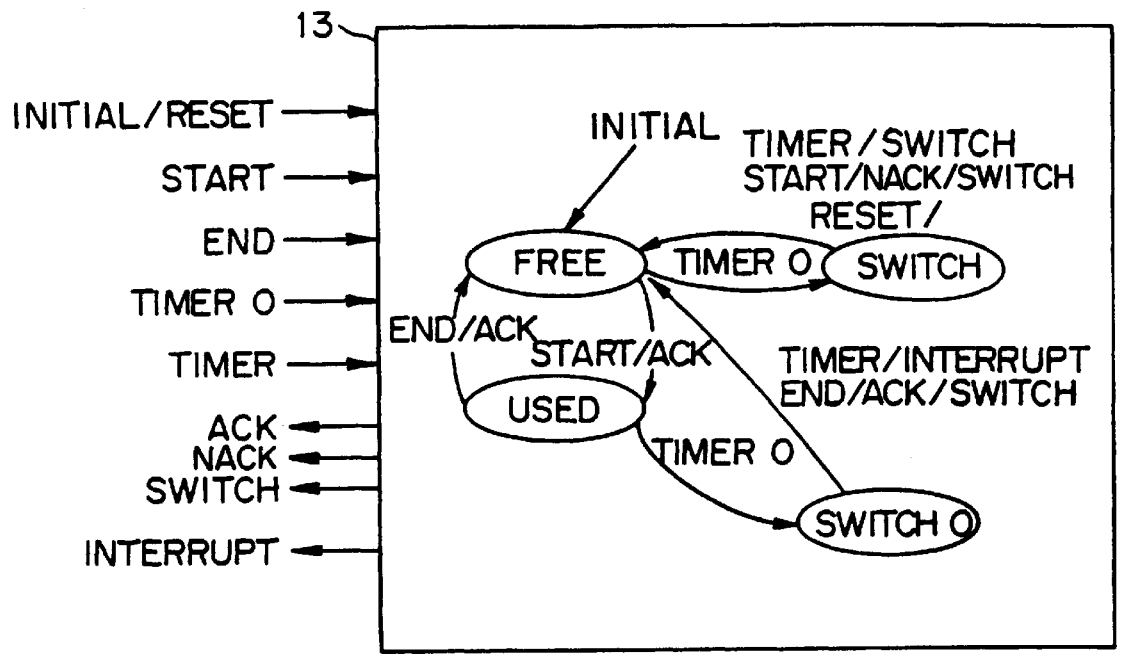
FIG. 4A is an explanatory diagram illustrating a status transition of a fourth operating mode.

In the fourth operating mode of the preferred embodiment of this invention, as shown in FIG. 4A, the status management unit 14 (shown in FIG. 2A) controls four status, namely the "free" status, the "used" status, the "switch" status and the "switch0" status as with the third operating mode.

The status transition from the initial status to the "free" status, as well as the status transitions from the "free" status, the "used" status and the "switch" status and their accompanying operations, are the same as those for the third operating mode as shown in FIG. 3C.

The "switch0" status is also quite similar to that for the third operating mode as shown in FIG. 3C. However, in a switch inhibition status (the "used" status or the "switch0" status) for delaying the invocation of a process switch, to prevent a process currently being executed from occupying CPU time for an extended period, after a lapse of a predetermined period after the current status shifts to "switch0" status based on the input from the advance timer signal "timer0", the process switch control unit 13 outputs to the CPU in the processor 10 an interruption signal "Interrupt" (not shown), and the status management unit 14 resets the current status to the "free" status.

Figure 7A:
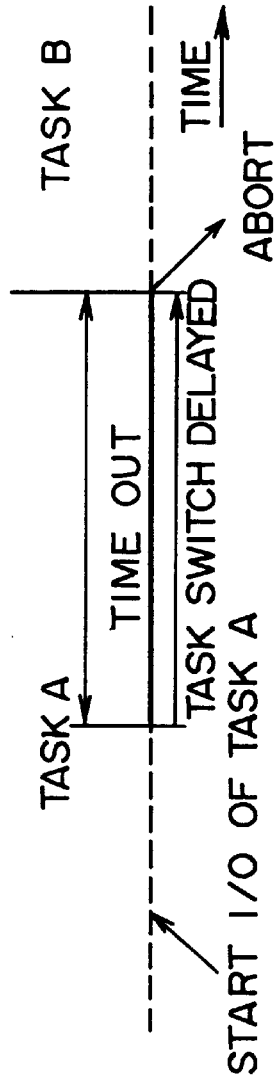
FIG. 7A is a timing chart illustrating a process switch of the fourth operating mode.

FIG. 7A is a timing chart illustrating a process switch of the fourth operating mode.

When a task A has started an input/output (I/O) processes, the invocation of a task switch (a process switch) is delayed for a predetermined duration "Time-Out", thus rendering likely the completion of an input/output process. When an input/output process does not happen in that duration, the input/output process is suspended, and data on the intermediate process of task A is saved as necessary, thereby switching the task from task A to task B.

This ensures control so that a single process does not occupy a CPU time over an extended period of time.

Figure 4B:
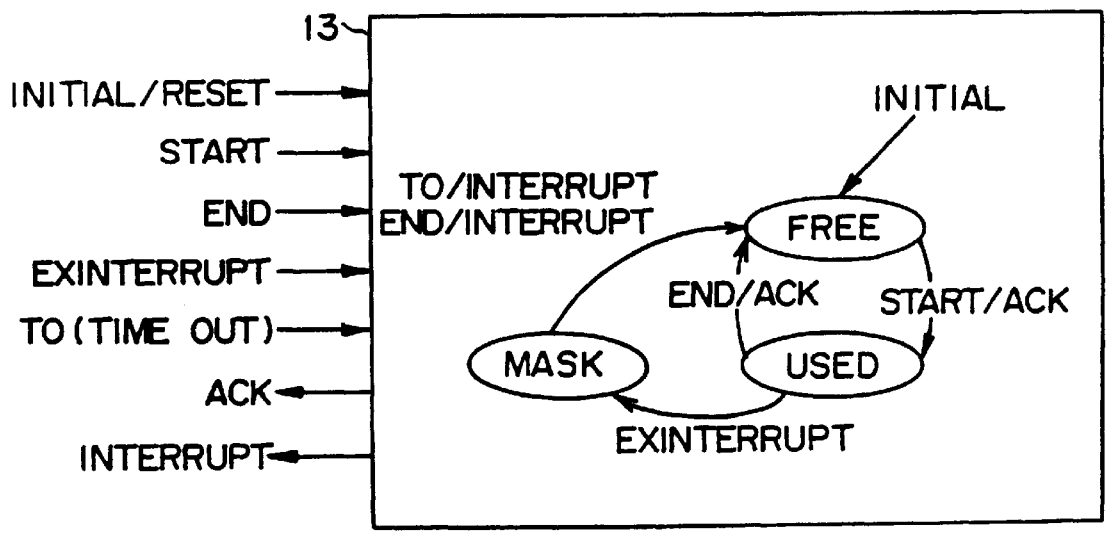
FIG. 4B is an explanatory diagram illustrating a status transition of a fifth operating mode.

In a fifth operating mode of the preferred embodiment of this invention, the status management unit 14 (FIG. 2A) controls three status, namely the "free" status, the "used" status, and the "mask" status, as shown in FIG. 4B. The meanings of the "free" status and the "used" status are the same as those for the first operating mode shown in FIG. 3A. The "mask" status is defined as a status to which the current status shifts from the "used" status, upon a generation of an asynchronous external interruption "ExInterrupt".

Upon a generation of the asynchronous external interruption "ExInterrupt", the status management unit 14 shifts the current status from the "used" status to the "mask" status, thereby delaying generation of the asynchronous external interruption. Then, upon the generation of a timeout event "TO", indicating a lapse of a predetermined duration, or upon the receipt of control signal "End" from the processor 10, indicating an event that a process currently being executed has completed an input/output process or a message communication, the process switch control unit 13 outputs to the processor 10 a held interruption signal "Interrupt" (not shown).

FIG. 8A is the first of block diagrams illustrating in a two-part series an example of the asynchronous interruption control circuit realizing the fifth operating mode.

FIG. 8B is the second of block diagrams illustrating in a two-part series an example of the asynchronous interruption control circuit realizing the fifth operating mode.

Such an asynchronous interruption control circuit is provided in the process switch control unit 13 (shown in FIG. 2A).

A conventional asynchronous interruption process is such that, as shown in FIG. 8A, an OR circuit 60 obtains a logical disjunction of interruption signals such as asynchronous interruption signals, and supplies its output to the CPU. On the other hand, according to the configuration shown in FIG. 8B for realizing the fifth operating mode, when a task currently being executed starts an input/output process or a message communication, the "I/O Start" signal sets a set/reset flip-flop 61, thereby storing in a memory that the above process is being executed. In this status, "0" is the logical value from the inversion of a signal of "mask", which is an output from the set/reset flip-flop 61, and an AND circuit 62 masks an output from the OR circuit 60, thereby inhibiting an interruption of the CPU. Thus, it becomes possible to prevent an asynchronous interruption from being generated, while a task currently being executed is performing e.g. a critical input/output process. Upon completion of an input/output process currently being executed, "I/O End" signal resets the set/reset flip-flop 61, thus clearing the mask of an interruption signal.

Figure 5A:
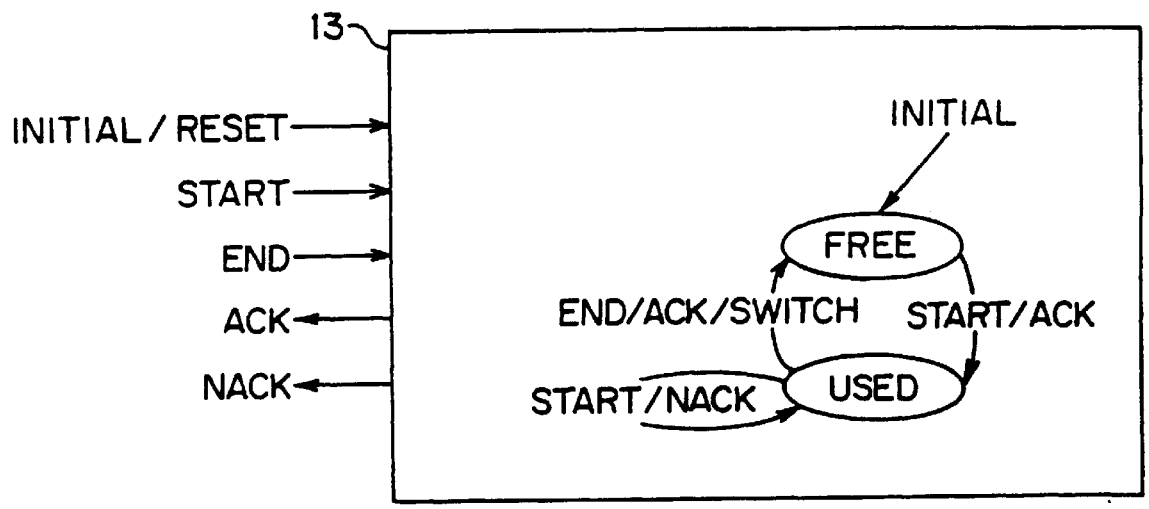
FIG. 5A is an explanatory diagram illustrating a status transition of a sixth operating mode.

In the sixth mode of the preferred embodiment of this invention, as shown in FIG. 5A, the status management unit 14 (shown in FIG. 2A) controls two status, namely the "free" status and the "used" status. The meanings of the "free" status and the "used" status are the same as those for the first operating mode shown in FIG. 3A.

In the sixth operating mode, the following control is executed such that, while one process is engaged e.g. in a message transmission, another active (executable) process cannot execute a message transmission.

An initial setting of the "free" status, as well as a status transition from the "free" status to the "used" status, based on control signal "Start" and its accompanying operation of outputting control signal "ack", are the same as those of the first operating mode.

In the "used" status, when the process switch control unit 13 receives from the processor 10 control signal "Start", indicating an event that another active (executable) process starts an input/output process or a message communication, the switch control unit 15 returns to the processor 10 a control signal "nack" indicating the rejection of a request for the above event. Then, in the "used" status, when the process switch control unit 13 receives from the processor 10 control signal "End", indicating an event that a process currently being executed ends a message communication using the transfer control apparatus 16 or an input/output process for the I/O device 17, the status management unit 14 shifts the current status to the "free" status. Then the switch control unit 15 outputs to the processor 10 control signal "Switch", instructing the invocation of a process switch, concurrently with control signal "ack", which is a response signal for the above event.

Figure 7B:
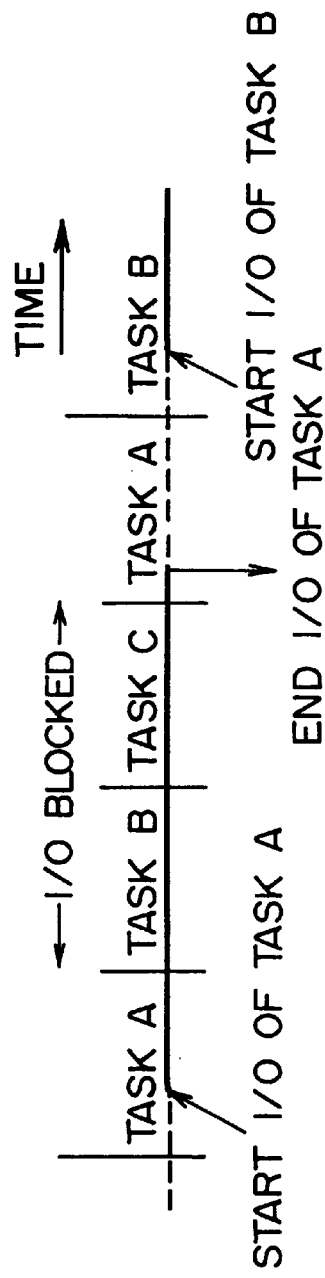
FIG. 7B is a timing chart illustrating a process switch of the sixth operating mode.

FIG. 7B is a timing chart illustrating a process switch of the sixth operating mode. Assuming here that task A, task B or task C are in a status capable of being run. For example, when a CPU execution right is switched to task B or task C in a status in which task A has started an input/output (I/O) process, task B or task C are not given an I/O access right. In an example shown in FIG. 7B, after task A completes its input/output process, task B starts its input/output process.

Figure 9A:
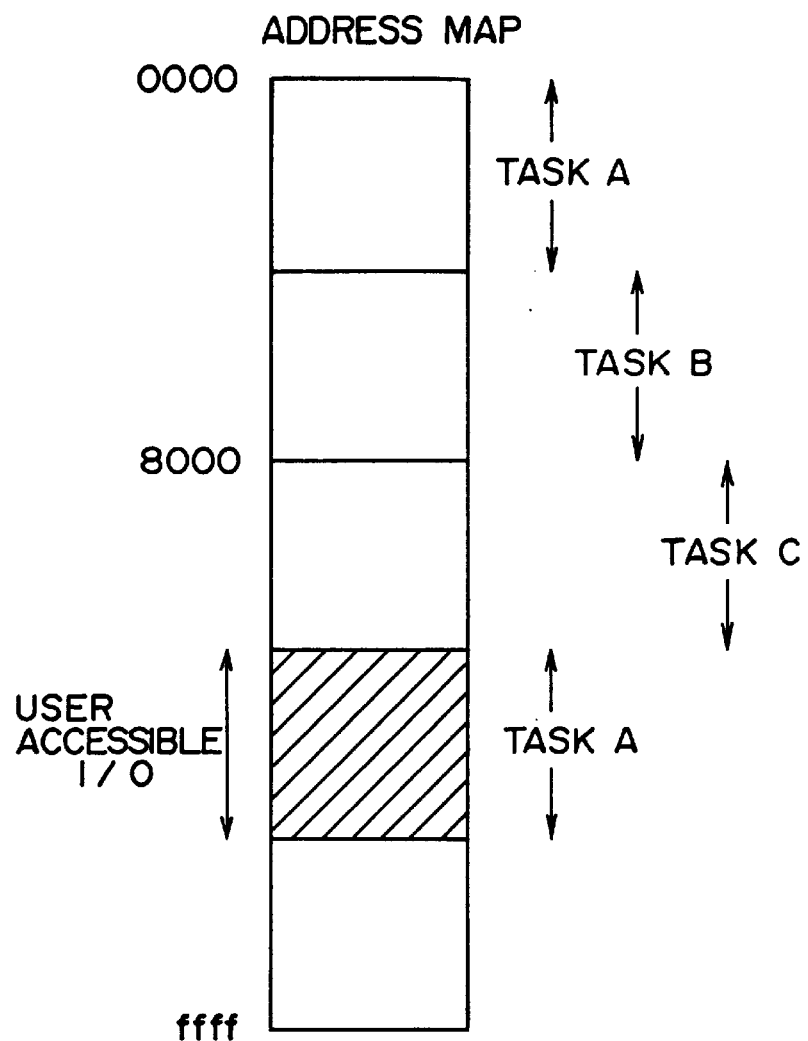
FIG. 9A is the first of explanatory charts illustrating in a two-part series the control of an access right of the seventh operating mode.

Finally, in the seventh operating mode of the preferred embodiment of this invention, as shown in FIG. 9A; for example, when task A, task B and task C are in a status capable of being run, an access right to this address space is restricted, such that an address space (a user accessible I/O) capable of invoking an input/output (I/O) process is made available only to task A, and that any other task i.e. task B or task C cannot access to this address space. The restriction on an access right can be realized by a peripheral art e.g. on a main memory protection.

In addition, in the seventh operating mode, when task B or task C whose access right is restricted attempts to access an I/O, the OS 11 takes over control e.g. upon generating an interruption, the OS 11 changes the status of task B or task C having experienced an interruption e.g. to a I/O standby status. As a result, until the I/O of task A is completed, task B and task C which are in a standby status e.g. for an I/O are not given a CPU time.

Figure 5B:
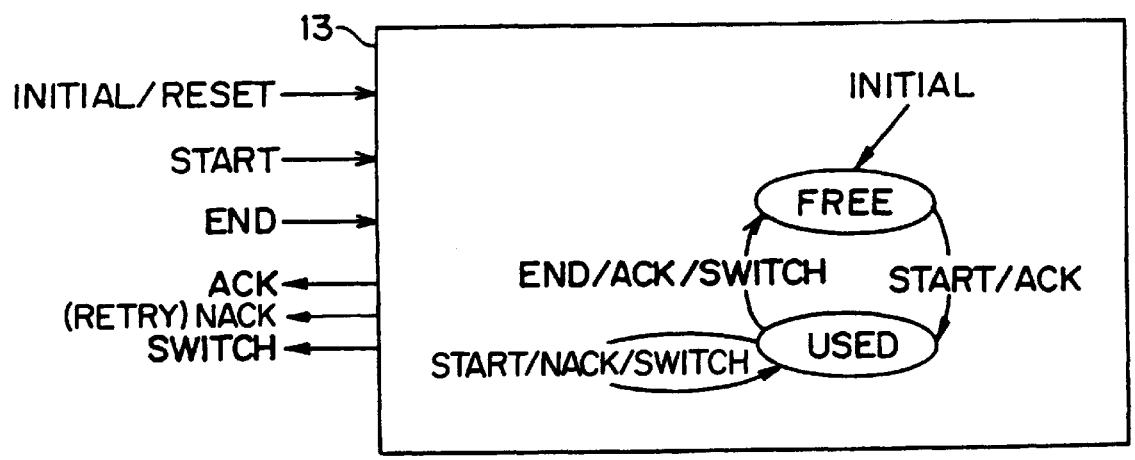
FIG. 5B is an explanatory diagram illustrating a status transition of a seventh operating mode.

FIG. 5B is an explanatory chart illustrating a status transition of the seventh operating mode.

The start of an input/output process of task A prompts the status management unit 14 to shift the current status from the "free" status to the "used" status.

In the "used" status, even if any other task, i.e. task B or task C, attempts to start an input/output process, a process switch sets the status of the other task to an I/O standby status. When task A completes an input/output process, the status management unit 14 returns the current status to the "free" status, thereby enabling the start of an input/output process by another task, i.e. task B or task C.

Figure 9B:
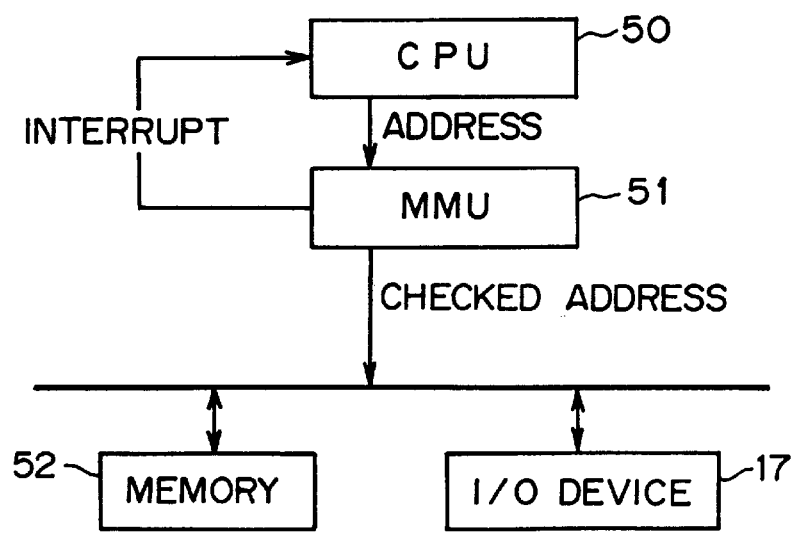
FIG. 9B is the second of explanatory charts illustrating in a two-part series the control of an access right of the seventh operating mode.

FIG. 9B is a block diagram illustrating an example of the system configuration for realizing the seventh operating mode. A memory managing unit (MMU) 51 has a mechanism for checking an address outputted from the CPU 50. The OS 11 (shown in FIG. 2A) sets into a module of the memory managing unit 51 data on which task can access an I/O area. Hence, when an address issued by a task without an access right is inappropriate, an interruption is generated, and a task switch (a process switch) is invoked. The use of an access protection function by the memory managing unit 51 is quite normal under a multi-task environment, and there is little requirement for modifying an apparatus for realizing the seventh operating mode. It goes without saying that an access check mechanism having a comparable function can realize the seventh operating mode.

Figure 10A:
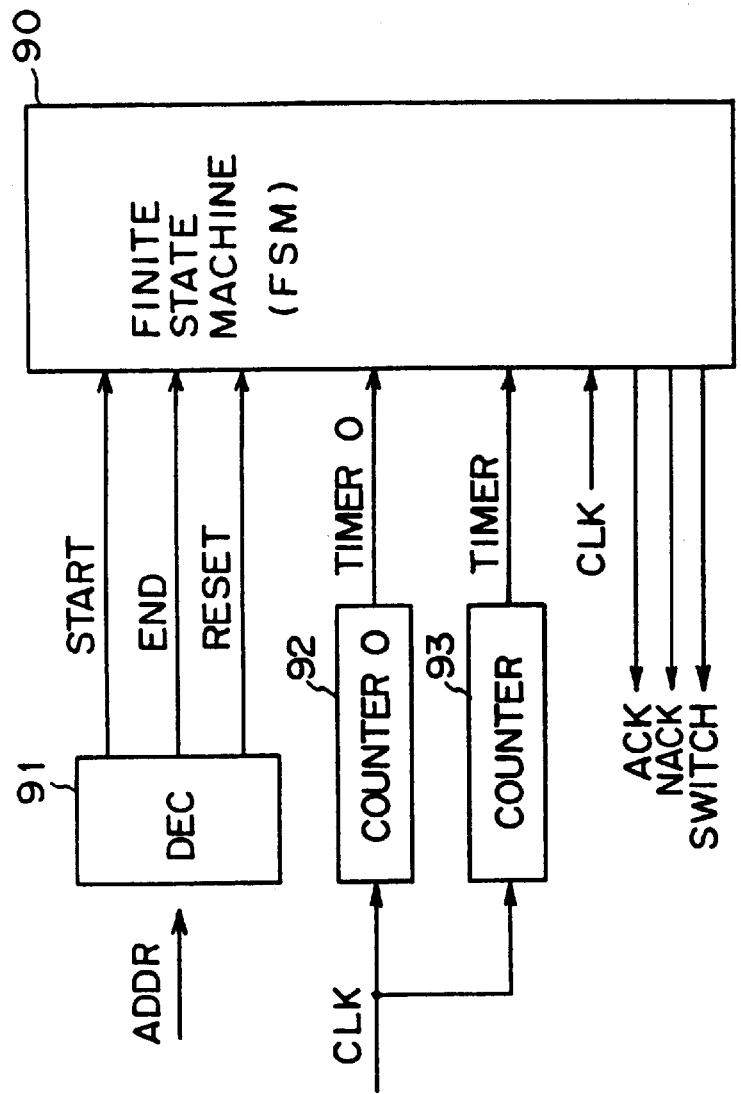
FIG. 10A is a block diagram illustrating an example of the system configuration for realizing the process switch control apparatus 13 shown in FIG. 2A.
Figure 10B:
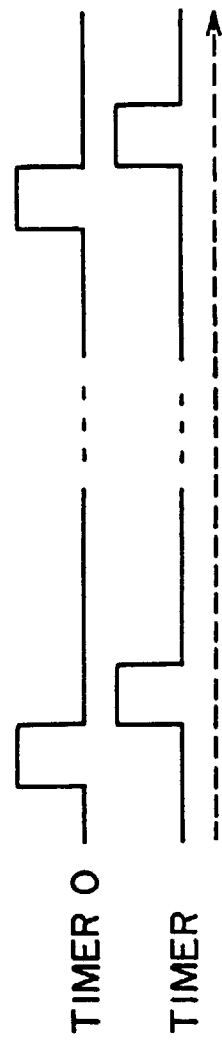
FIG. 10B is a timing chart illustrating counter output timings of the process switch control apparatus 13 whose configuration is shown in FIG. 10A.

FIG. 10A is a block diagram illustrating an example of the system configuration for realizing the process switch control unit 13 shown in FIG. 2A. FIG. 10B is a timing chart illustrating counter output timings of the process switch control unit 13 whose configuration is shown in FIG. 10A.

Described below is a substantive example of structuring the process control unit 13 for realizing the third operating mode.

In FIG. 10A, a finite state machine (FSM) 90 controls finite states, shifts finite states by an input signal, and outputs various control signals based on the current state and an input signal. A decoder (DEC) 91 decodes an address outputted from the CPU in the processor 10 (shown in FIG. 2A). A first counter 92 (counter0) counts a clock CLK outputted from the CPU, and outputs the advance timer signal "timer0" when its counter value is equal to a predetermined value. A second counter 93 (counter) counts the clock CLK, and outputs the timer signal "timer" triggering a process switch when its counter value is equal to a predetermined value.

An instruction for an input/output process or a message communication invoked by the CPU of the processor 10 (shown in FIG. 2) is detected by an address outputted from the CPU. The decoder 91, by decoding an address outputted from the CPU, generates control signal "Start" upon start of a critical operation by the CPU (e.g. at the start of an input/output process or at the start of a message communication) and control signal "End" upon completion of a critical operation. The decoder 91 generates control signal "reset" based on a specific address outputted from the CPU in a similar manner. Although FIG. 2A shows that the processor 10 outputs these control signals, FIG. 10A shows that the decoder 91 in the process switch control unit 13 generates these control signals, based on an address outputted from the CPU of the processor 10.

Also, the first counter 92 (counter0) and the second counter 93 (counter) divide the clock CLK outputted from the CPU of the processor 10, and activate the advance timer signal "timer0" and the timer signal "timer" at predetermined timings, respectively. The timing of these counter output signals is set such that the advance timer signal "timer0" becomes active at a predetermined time interval before the timer signal "timer" becomes active, e.g. as shown in FIG. 10B. The time interval after which the timer signal "timer" becomes active matches the time interval of a process switch, which is sufficiently longer than the cycle of the clock CLK outputted from the CPU of the processor 10.

The finite state machine 90 receives the advance timer signal "timer0" and the timer signal "timer". The finite state machine 90 generates control signal "ack" and control signal "Switch", e.g. corresponding with a status transition shown in FIG. 3C. The CPU of the processor 10 (shown in FIG. 2A) confirms the normal completion (success) of a bus transaction, upon receiving control signal "ack". When the finite state machine 90 does not generate control signal "ack", (or when the finite state machine 90 generates a control signal "nack",) the CPU confirms an abnormal access completion, and either retries or aborts the process.

The CPU also invokes a process switch for executing another process by control signal "Switch".

It is easy to realize the finite state machine 90 by compiling the Verilog hardware descriptive statements shown in FIG. 11 and FIG. 12. Because Verilog is a well known hardware description language, a detailed explanation of these statements has been omitted. Here, only outlines of the statements shown in FIG. 11 and FIG. 12 are briefly explained.

The second line defines a module of the finite state machine 90. The third line lists input signals. Here, "int" is an initialization signal, which is shown as "initial" in FIG. 3A, FIG. 3B and FIG. 3C. The fourth line lists output signals.

The sixth line defines a register for managing a current status "cstate" and a next status "nstate". The eighth line defines 2-bit data expressions of respective status, namely the "free" status (FREE="00"), the "used" status (USED="01"), the "switch0" status (SWITCH0="10") and the "switch" status (SWITCH="11"). Two flip-flops allow the management of these status.

The ninth line through the thirty-eighth line show transitions to the next status by signals "cstate", "end", "start", "reset", "timer", "timer0" and "int".

Also, the fortieth line to the last line show the conditions for outputting control signals "ack" and "Switch".

Although only an example of the Verilog statements is presented here, one skilled in this art can easily realize, through an analogy to the above description, the status transitions of a finite state machine corresponding to other operating modes, as realized by the finite state machine 90 shown in FIG. 10A, therefore detailed explanations about them have been omitted here.

Already established has been an art of automatically designing a logic circuit realizing the finite state machine 90 (shown in FIG. 10A) by compiling the Verilog statements listed in FIG. 11 and FIG. 12.

What is claimed is:

1. A process switch control unit for use in a multiprocess system in which a plurality of processes operate time divisionally, comprising:

status management means for managing statuses including at least a first or free status, in which a process being executed in neither an input/output process nor a message communication, capable of invoking a process switch which enables an interruption of an operating system (OS) for managing job scheduling and processes an operation to be executed by a user, and a second or used status, in which a process being executed is either an input/output process or a message communication and even if the process switch control unit generates an event invoking a process switch, a switch control unit ignores the event, inhibiting said process switch from being invoked, because a process currently being executed is in either one of an input/output process or a message communication, which avoids an interruption of the OS for managing job scheduling and does not process an operation to be executed by a user; and switch control means for controlling the disablement of said process switch in said second status.

2. The process switch control unit according to claim 1, wherein:

said switch control means invokes said process switch, upon generating an event indicating that a process being executed in said second status has completed said either one of an input/output process and a message communication.

3. A process switch control unit for use in a multi-process system in which a plurality of processes operate time divisionally, comprising:

status management means for managing statuses including at least a first or free status, in which a process being executed in neither an input/output process nor a message communication, capable of invoking a process switch which enables an interruption of an operating system (OS) for managing job scheduling and processes an operation to be executed by a user, and a second or used status, in which a process being executed is either an input/output process or a message communication and even if the process switch control unit generates an event invoking a process switch, a switch control unit ignores the event, inhibiting said process switch from being invoked, because a process currently being executed is in either one of an input/output process or a message conmunuication, which avoids an interruption of the OS for managing job scheduling and does not process an operation to be executed by a user, and a third status indicating a status that a timer event invoking said process switch in said first status is generated for a predeterned duration; and switch control means for controlling the disablement of said process switch in said second status and for invoking said process switch, before said process starts either one of an input/output process or a message communication, upon generating an event indicating that a process being executed in said third status starts either one of an input/output process or a message communication.

4. A process switch control unit for use in a multi-process system in which a plurality of processes operate time divisionally comprising:

status management means for managing statuses including at least a first or free status, in which a process being executed in neither an input/output process nor a message communication, capable of invoking a process switch which enables an interruption of an operating system (OS) for managing job scheduling and processes an operation to be executed by a user, and a second or used status, in which a process being executed is either an input/output grocess or a message communication and even if the process switch control unit generates an event invoking a process switch, a switch control unit ignores the event, inhibiting said process switch from being invoked, because a process currently being executed is in either one of an input/output process or a message communication, which avoids an interruption of the OS for managing job scheduling and does not process an operation to be executed by a user, a third status indicating a status that a timer event invoking said process switch in said first status is generated for a predetermined duration, and a fourth status indicating a status that a timer event invoking said process switch in said second status is generated for a predetermined duration; and switch control means for controlling such that said process switch does not take place in said second status, for invoking said process switch before the start of a process corresponding to that event upon generating an event indicating that a process being executed in said third status starts either one of an input/output process or a message communication, and for invoking a process switch based on said timer event upon generating a timer event invoking said process switch in said fourth status after generating an event indicating that a process being executed in said fourth status has completed either one of an input/output process or a message communication.

5. The process switch control unit according to claim 4, wherein:

said switch control means generates an interruption for suspending a process executing said either one of an input/output process or a message communication when said fourth status continues over a predetermined duration.

6. A process switch control unit for use in a multi-process system in which a plurality of processes operate time divisionally, comprising:

status management means for managing statuses including at least a first or free status, in which a process being executed in neither an input/output process nor a message communication, capable of invoking a process switch which enables an interruption of an operating system (OS) for managing job scheduling and processes an operation to be executed by a user, and a second or used status, in which a process being executed is either an input/output process or a message communication and even if the process switch control unit generates an event invoking a process switch, a switch control unit ignores the event, inhibiting said process switch from being invoked, because a process currently being executed is in either one of an input/output process or a message communication, which avoids an interruption of the OS for managing job scheduling and does not process an operation to be executed by a user, a second status inhibiting said process switch from being invoked, because a process currently being executed is in either one of an input/output process or a message communication, which avoids an interruption of the OS for managing job scheduling and does not process an operation to be executed by a user, and a third status to which the current status changes from said second status, upon asynchronously generating a request indicating an external interruption (External Interrupt); and switch control means for controlling such that said process switch does not take place in said second stams, for holding a request of said external interruption in said third status, and for invoking an interruption corresponding to said request of said held external interruption, upon generating an event indicating that said third status continues over a predetermined period of time or that a process currently being executed in said third status has completed either one of an input/output process or a message communication.

7. A process control unit for use in a multi-process system in which a plurality of processes operate time divisionally, comprising:

status management means for managing statuses including at least a first or free status, in which a process being executed in neither an input/output process nor a message communication, capable of starting either one of an input/output process or a message communication which enables an interruption of an operating system (OS) for managing job scheduling and processes an operation to be executed by a user, and a second or used status, in which a process being executed is either an input/output process or a message communication and even if the process switch control unit generates an event invoking a process switch, a switch control unit ignores the event, in which either one of said input/output process or said message communication is currently being executed which avoids an interruption of the OS for managing job scheduling and does not process an operation to be executed by a user; and control means for controlling, upon generating an event indicating that a process being executed in said second status starts either one of an input/output process or a message communication, for inhibiting said process from executing said event.

8. The process control unit according to claim 7, wherein:

said control means invokes said process switch, upon generating an event indicating that either one of an input/output process or a message communication has been completed in said second status.

9. A process control unit for use in a multi-process system in which a plurality of processes operate time divisionally, comprising:

status management means for managing statuses including at least a first or free status, in which a process being executed in neither an input/output process nor a message communication, capable of starting either one of an input/output process for a message communication which enables an interruption of an operating system (OS) for managing job scheduling and processes an operation to be executed by a user, and a second or used status, in which a process being executed is either an input/output process or a message communication and even if the process switch control unit generates an event invoking a process switch, a switch control unit ignores the event, in which either one of said input/output processes or said message communication is currently being executed, which avoids an interruption of the OS for managing job scheduling and does not process an operation to be executed by a user; and control means for permitting a process that has started said either one of said input/output process or said message communication to have an access right to the address space for executing said either one of said input/output process or said message communication, upon a status transition from the current status to said second status, for prohibiting the same to any other executable process, and for handing said access right over to the address space in said second status, upon generating an event indicating the completion of either one of an input/output process or a message communication.

10. A process switch control method for use in a multi-process system in which a plurality of processes operate time divisionally, comprising:

controlling a first or free status in which a process being executed is neither an input/output process or a message communication; and controlling a second or used status in which a process being executed is either one of said input/output process or said message communication and even if the process switch control method generates an event invoking a process switch, a switch control unit ignores th event, which avoids an interruption of an operating system (OS) for managing job scheduling and does not process an operation to be executed by a user, such that a process switch does not take place.

11. A process switch control method for use in a multi-process system in which a plurality of processes operate time divisionally, comprising:

controlling a first or free status in which a process being executed is neither an input/output process or a message communication;

controlling upon generating an event indicating that a second or used process starts either one of an input/output process or a message communication in a status in which said one process executes either one of an input/output process or a message communication and even if the process switch control method generates an event invoking a process switch, a switch control unit ignores the event; and such that said another process does not allow said event which avoids an interruption of an operating system (OS) for managing job scheduling and does not process in operation to be executed by a user.

12. A process control method for use in a multi-process system in which a plurality of processes operate time divisionally, comprising:

controlling a first or free status in which a process being executed is neither an input/output process or a message communication;

controlling a second or used status in which a process being executed is either one of said input/output process or said message communication;

when the process of the second status accesses to the address space for executing either one of input/output process or a message communication, permitting an access right to said address space to a process that has started said either one of an input/output process or a message communication and of prohibiting the same to any other executable process, which avoids an interruption of an operating system (OS) for managing job scheduling and does not process an operation to be executed by a user; and changing said access right to the address space, upon generating an event indicating that said either one of an input/output process or a message communication has been completed.

* * * * *

UNITED STATES PATENT AND TRADEMARK OFFICE
CERTIFICATE OF CORRECTION

PATENT NO.: 6,055,559
DATED : April 25, 2000
INVENTOR(S): Toshiyuki SHIMIZU, et al.

It is certified that errors appear in the above-identified patent and that said Letters Patent is hereby corrected as shown below:

Col. 12, line 37, after "divisionally" insert --,--.

Col. 12, line 46, change "grocess" to --process--.

Col. 13, line 45, change "stams" to --status--.

Signed and Sealed this

Twenty-seventh Day of February, 2001

NICHOLAS P. GODICI

*Attest:*

*Attesting Officer*   *Acting Director of the United States Patent and Trademark Office*